Oct. 1, 1963
R. E. BELL ETAL
3,105,940
MOTION DETECTING DEVICE
Filed Sept. 18, 1958
3 Sheets-Sheet 2
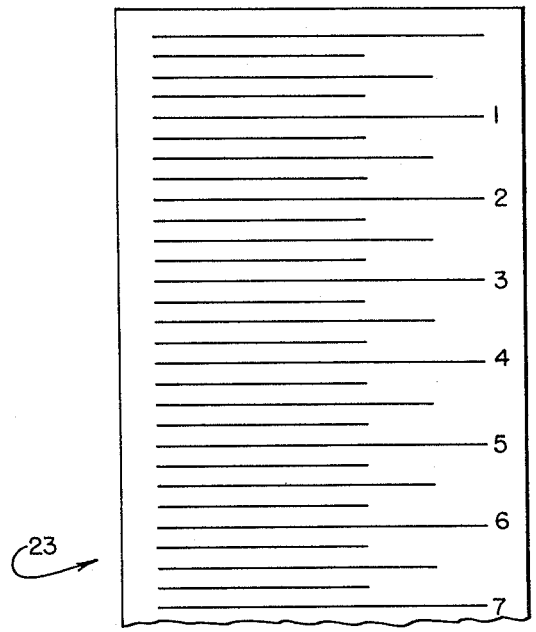
Fig. III
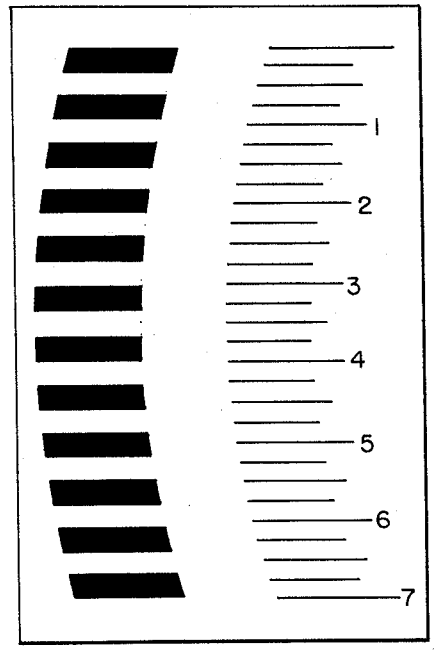
Fig. IV
INVENTORS
ROBERT E. BELL
CLARENCE S. SIMONDS
BY
Marshall, Marshall & Yeasting
ATTORNEYS

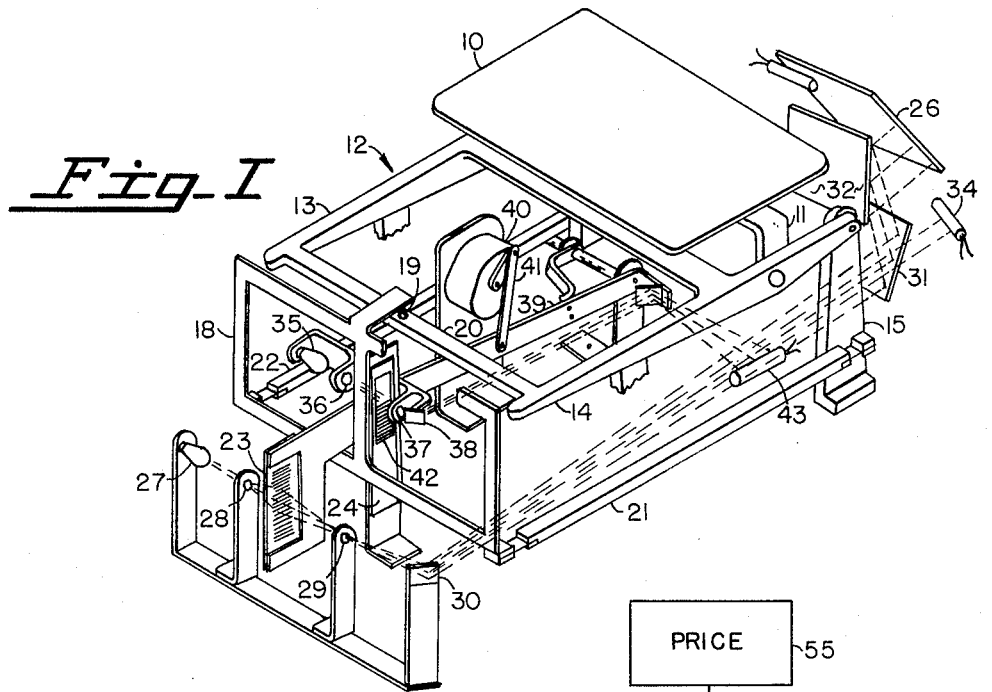

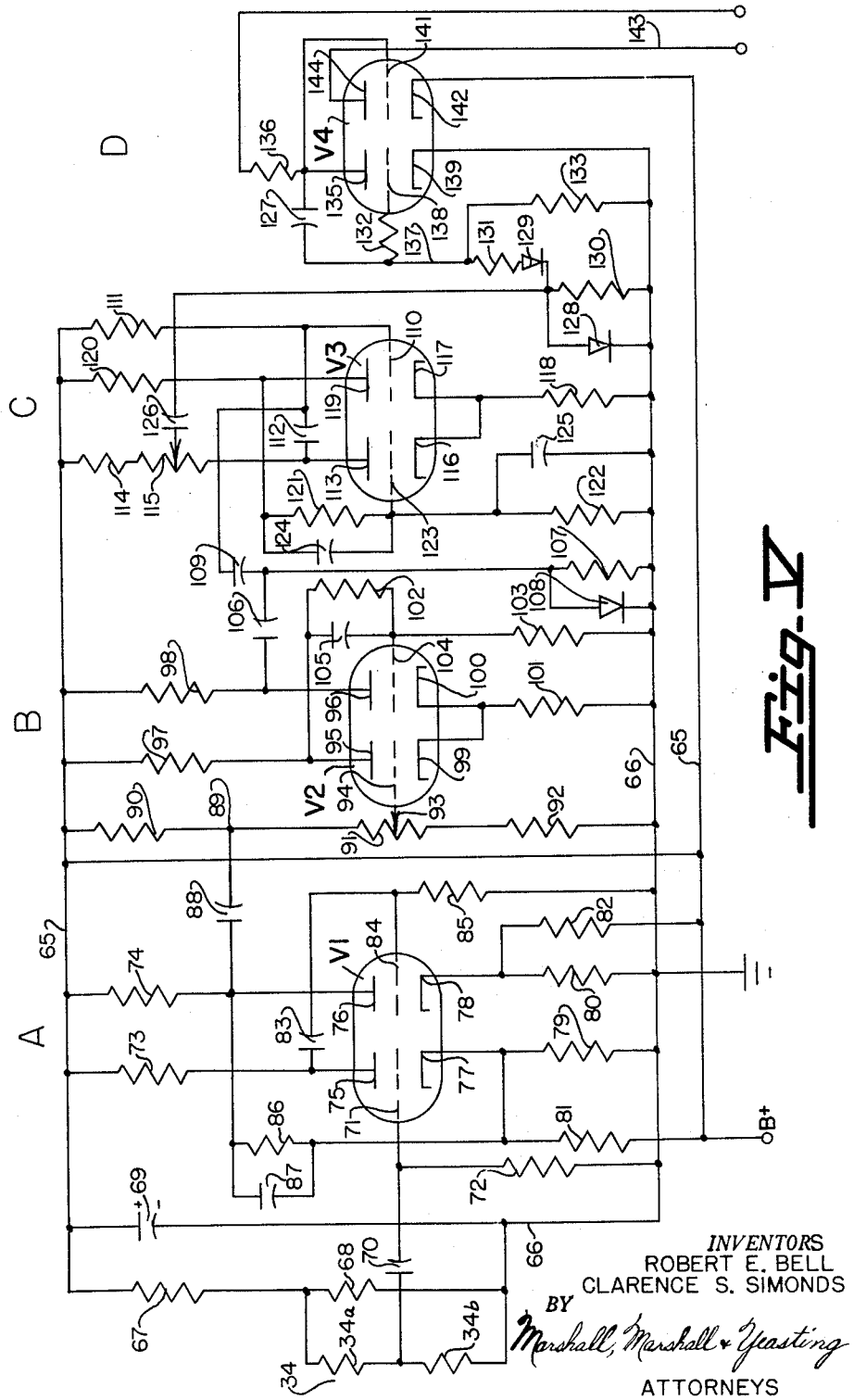
Fig. V
INVENTORS
ROBERT E. BELL
CLARENCE S. SIMONDS
BY
Marshall, Marshall & Yeasting
ATTORNEYS

United States Patent Office 3,105,940
Patented Oct. 1, 1963

3,105,940
MOTION DETECTING DEVICE
Robert E. Bell and Clarence S. Simonds, Toledo, Ohio, assignors to Toledo Scale Corporation, Toledo, Ohio, a corporation of Ohio
Filed Sept. 18, 1958, Ser. No. 761,857
7 Claims. (Cl. 328—132)

This invention relates to electrical control equipment and in particular to equipment for producing a signal indicative of the quiescence of a condition responsive apparatus or measuring instrument.

Various types of condition responsive instruments such as weighing scales or similar apparatus have movable indicating mechanisms that overshoot or oscillate as they approach their final indicating positions. Recording apparatus is often used with such equipment to make a printed record of the indication of the instrument either at periodic intervals of time or after the application of load or some other event. In order that such recordings be an accurate record of the true indication of the instrument it is necessary that the instrument be in a state of quiescence immediately prior to and during the recording. It has been customary to place the control of the recording apparatus under the direct supervision of a human operator who, by observing the movement of the indicating mechanism of the instrument, may initiate a recording operation whenever he observes that the indicating mechanism of the instrument has come to rest. This method of operation employing the human supervisor is undesirable in that not only does it require the services of the supervisor but it also is subject to his errors in judgment and to loss of accuracy or time since he may initiate a recording action before the apparatus has come to rest or he may delay the initiation of the recording an undue length of time after the equipment has come to rest.

The principal object of this invention is to provide an electrical control system that is responsive to motion of the indicating portion of an instrument as long as such motion is sufficient to warrant the interruption of a recording operation or prevent the start of a recording operation.

Another object of the invention is to provide control equipment responsive to the movement of the indicator or indicating element of a measuring instrument to provide an output signal whenever the motion of the instrument exceeds a predetermined velocity or extent.

A still further object of the invention is to provide control equipment that not only responds quickly to the indicator coming to rest but which is also sensitive to objectional movement of the indicator.

More specific objects and advantages are apparent from the following description of a preferred form of the invention.

According to the invention means are provided for generating an electrical impulse for each increment of movement of the movable element of the measuring system, a single cycle oscillator is connected to be responsive to such generator impulses to generate output pulses for each input pulse received while it is not responding to a previous pulse, and a counter is arranged to count the output pulses of the oscillator per unit of time.

A preferred embodiment of the invention is illustrated in the accompanying drawings.

In the drawings:

FIG. I is a perspective, schematic view of the indicating mechanism of a weighing scale embodying control equipment constructed according to the invention.

FIG. II is a block diagram showing the cooperation of the various electrical circuits making up the improved control.

FIG. III is an enlarged fragmentary portion of a scale chart suitable for use in the improved equipment.

FIG. IV is a similar chart showing another proportioning between the graduations and the other markings employed in the control circuits.

FIG. V is a schematic wiring diagram of the control circuit used for detecting relative motion of the parts of the weighing scale.

These specific figures and the accompanying description are intended merely to illustrate the invention and not to impose limitations on its scope.

In the arrangement shown in FIG. I a load receiver 10 is carried on a spider 11 that is pivotally mounted on a lever 12 having spaced apart arms 13 and 14. The lever 12 is carried on fulcrum stands 15 of which only one is visible in the figure. A check link, not shown, is employed to keep the load receiver 10 in a level condition at all times. Such check links are well known in the weighing scale art. Load counterbalancing springs, not shown, that are connected between the lever arms 13 and 14 and a rigid support are arranged so that the vertical movement at the free ends of the lever arms 13 and 14 is proportional to the weight of the load placed on the load receiver 10. A lightweight frame 18, supported on a cone pivot 19 mounted in the center of a cross bar 20 connecting the ends of the lever arms 13 and 14 and guided by check links 21 and 22, serves as a support for a movable projection chart 23 and for a mask 24. The frame 18 is provided with the three point support, i.e. the pivot 19 and the check links 21 and 22, so that it is not subjected to any bending or twisting strains that would tend to distort it and so that it follows the average motion of the lever arms 13 and 14 regardless of the distribution of load on the load receiver 10.

Visual indications of the load on the scale are provided by an optical projection system that projects enlarged images of the graduations of the projection chart 23 onto a screen 26. The optical projection system includes a light source 27, a condensing lens 28, a projection lens 29, mirrors 30, 31 and 32 and the screen 26. A portion of the projection chart 23 is illustrated in FIG. III. In addition to providing the visual projected indication on the chart 26 the optical projection system also projects images of the left hand portion of the chart lines as seen in FIG. III onto a photocell 34 that cooperates with electronic equipment to provide a signal indicating relative motion between the indicating mechanism of the scale and the frame of the scale.

The indicating system also includes means for delivering or providing a series of electrical impulses corresponding in number to the weight of the load on the scale. This indicating means includes a second light source 35 and condensing lens 36 which together with a projection lens 37 and mirror 38 are mounted on an oscillating arm 39 that is driven by a motor 40 by means of a crank and connecting rod 41. This moving optical system scans a stationary chart 42 that is variably masked by the mask 24 and projects images of the exposed graduations onto a stationary photocell 43. Electronic amplifying and counting means connected to the photocell 43 give an indication of the weight of the load in accordance with the number of images of the exposed graduations that are swept across the photocell by the movement of the moving optical system. The photocells 34 and 43 are each provided with masks or slots approximately equal in width to the width of a projected graduation line so as to get the maximum signal output from the photocell for each graduation that is swept across the cell.

In a complete indicating system electronic means are employed to respond to the signals generated in the photocells 34 and 43 to provide an indication of weight only after the weighing mechanism has come to rest and an accurate reading may be taken. This equipment, as indicated in block form in FIG. II, includes a scanner 50 which includes the optical system comprising the light source 35 and the projection lens 37 up to and including the photoelectric cell 43 and any preamplifier used therewith. Electrical pulses from the scanner 50 are passed through an amplifier 51 and gate 52 into an electronic multiplier 53. The electronic multiplier 53 is arranged to feed a plurality of pulses into an amount counter 54 in accordance with a price set up in a price setting mechanism 55. The multiplier 53 also delivers one output pulse for each pulse received to a weight counter 56. The signals to the weight counter 56 could just as well be taken from the output of the gate 52 without passing through the multiplier 53 except that the arrangement shown insures that no indication will be produced in the weight counter 56 unless the multiplier 53 is in operating condition.

To guard against the possibility of a fractional or incomplete scan being read as a complete scan a scan detector 57 serving as a first gate is connected to the output of the amplifier 51 and includes electronic circuits responsive to the envelope of the series of pulses produced by the scanner 50 and arranged to deliver a signal to a reset amplifier 58 to reset the counters 54 and 56 at the start of each scan. This reset occurs on the first pulse of a scan which preferably is produced by a single graduation or line spaced about five units ahead of the regular series of graduations of the chart 42. The scan detector 57 also operates the gate 52.

When a system is to be operated automatically it is also necessary to prevent signals from the scanner from reaching the multiplier and, through it, the amount and weight counters unless the scale is at rest in order that the indications be indicative of the actual load on the scale. This is accomplished by means of the photocell 34 included in the photo-pickup circuit 59 which in cooperation with an amplitude and frequency filter 60 control the scan detector 57 to prevent it from opening the gate 52 unless the weighing scale is substantially at rest and a scan is ready to start.

The circuits comprising the photo-pickup 59 and the amplifier and frequency filter 60 are a form of motion detector. For satisfactory operation of such a motion detector in high speed operating equipment it is necessary that the detector respond very quickly to relative motion exceeding a certain amount and also deliver an all clear or quiescent condition signal immediately upon the system reaching a quiescent state. An elementary form of motion detector circuit generally similar to that employed in the photo-pickup 59 and the amplitude-frequency filter 60 is illustrated in an application of Robert E. Bell et al. Serial No. 657,826 filed May 8, 1957. The detector circuit shown in that application has a relatively slow response and a long recovery time with the result that it sometimes fails to detect a sudden jiggling movement of the scale and also requires an excessively long time to recover after a large movement of the scale indicator. Circuits employed in the photo-pickup 59 and amplitude and frequency filter 60, as shown in FIG. V, provide quick response and quick recovery as well as being able to distinguish small quick movements of the weighing scale of an amplitude not sufficient to materially affect the accuracy from larger slower movements which would affect the accuracy of recording.

Two forms of charts suitable for use in a projected indication system are illustrated in FIGS. III and IV. The chart shown in FIG. III is a small fragment, at greatly enlarged scale, suitable for use when from 500 to 1,000 graduations must be provided in the weighing range. The chart shown in FIG. IV, in contrast, is suitable for those applications where the weighing range need not be divided into small increments but may consist of several large steps whereby the weights are classified in groups rather than being recorded exactly. An example of this latter type of scale is a postage scale. In this latter case, as indicated in FIG. IV, the graduations are placed along a curve which for the chart 23 has a radius equal to the length of the check links 21 and 22. The curvature of the series of graduations on the chart compensates for the curve followed by the chart as it is carried by the frame 18 to provide an apparent straight line motion of the projected images of the graduations as they are swept across the screen 26.

The electronic circuits included in the photo-pickup 59 and the amplitude and frequency filter 60 are illustrated in detail in FIG. V. These circuits include a first stage A including a duotriode tube V-1 that serves as a two stage amplifier for amplifying the signals from the photocell 34. A second stage B including a duotriode tube V-2 serves as an amplitude filter in that it responds only to signals exceeding a certain level as delivered by the first stage and delivers an invariant sharp-sided pulse for each received signal. A third stage C including a duotriode V-3 serves as a single cycle oscillator or, as illustrated, a monostable multivibrator that responds only to those pulses received from the second stage B while it is in its stable state. The third stage C or single cycle oscillator serves as a frequency filter in that it responds to each pulse received from the trigger stage B as long as the pulses occur at a low repetition frequency and responds to less than all of the pulses when the pulses arrive at a higher frequency thereby producing output pulses that never exceed a certain repetition frequency. This repetition frequency is selected by design to correspond to the frequency of the pulses generated in the photoelectric cell 34 when the indicator is moving just rapidly enough to cause an objectionable error if a recording is taken. With a weighing scale as illustrated in FIG. I, having a natural period of ½ to ¾ of a second, the recovery time of the monostable multivibrator V-3, stage C, is adjusted to be in the order of 25 to 30 milliseconds. Thus the maximum output frequency of the multivibrator is in the order of 30 to 40 cycles per second. The maximum frequency applied to the multivibrator through the trigger circuit B may, for large changes of load, be several thousand cycles per second.

The output pulses from the multivibrator or single cycle oscillator C are integrated and applied through an output control stage D including a duotriode V-4. This stage delivers an output signal whenever the input frequency rises above a certain predetermined frequency which signal is used to block or control the scan detector 57 and thus prevent the transmission of pulses into the multiplier and weight counters unless the scale is substantially at rest.

Referring to the circuits in detail, stages A, B, and C are supplied with electrical power from a B+ line 65, one portion of which extends along the bottom of the diagram and another portion along the top. The circuits are all returned to a grounded line 66 extending along the bottom of the diagram just above the lower B+ line 65. The photocell 34, having two conductive elements 34-A and 34-B connected in series, is supplied from the B+ line through a voltage divider comprising resistors 67 and 68, the resistor 68 being in parallel with the photocell so as to limit the voltage applied to the photocell 34 to the recommended value. The B+ voltage supplied to the voltage divider comprising the resistors 67 and 68 is stabilized or filtered by a relatively large condenser 69 connected between the B+ lead 65 and the grounded lead 66.

The center tap between the photocell sections 34-A and 34-B is connected through a coupling condenser 70 to a first control grid 71 of the duotriode V-1. Proper grid voltage for this grid 71 is maintained by a grid resistor 72 connected between the grid 71 and the grounded line 66. The duotriode V-1 serves as a two stage amplifier having plate resistors 73 and 74 connected between the B+ line 65 and plates 75 and 76 respectively. Cathodes 77 and 78 are connected to the ground line 66 by way of cathode resistors 79 and 80. To increase the voltage drop across the cathode resistors 79 and 80 beyond that supplied by the plate current flow through the individual triode sections resistors 81 and 82 are connected between the B+ lead 65, at the bottom of the diagram, and the cathodes to thus increase the grid-cathode bias without increasing the cathode circuit resistance.

The plate 75 of the first triode section of the tube V-1 is connected through a coupling condenser 83 to a grid 84 of a second section of the tube V-1 which grid is also connected to ground through a grid leak resistor 85. The plate 76 is also connected through a resistor 86 and parallel condenser 87 to the cathode 77 to provide an inverse feedback circuit thus stabilizing the gain of the amplifier.

The second plate 76, the output plate of the duotriode, is connected through a condenser 88 to an intermediate point 89 of a voltage divider comprising a resistor 90 connected to B+ and to the point 89 and a series combination of a potentiometer 91 and resistor 92 connecting the point 89 to the ground lead 66. A slider 93 of the potentiometer 91 is connected to a first grid 94 of the second duotriode V-2 which is connected to operate as a trigger circuit. For this use plates 95 and 96 of the two triode sections making up the duotriode V-2 are connected to the B+ lead 65 through plate resistors 97 and 98 respectively while cathodes 99 and 100 are connected through a common cathode resistor 101 to the grounded lead 66. The first plate 95 is connected to a voltage divider comprising resistors 102 and 103 to the grounded lead 66 with the intermediate point between the resistors connected to a control grid 104 of the second section of the duotriode V-2. Furthermore the first resistor 102 of the divider is bypassed with a small condenser 105. In this circuit the plate resistors 97 and 98 have resistances of approximately 30,000 ohms each while the common cathode resistor has a resistance of approximately 15,000 ohms. The voltage divider comprising resistors 102 and 103 is arranged such that approximately 45 percent of the voltage appearing at the plate 95 is applied to the grid 104.

This circuit acts as a trigger circuit with the second plate 96 and cathode 100 normally drawing current since the current flow through the second plate 96 and cathode resistor 101 is sufficient to raise the potential of the cathode 99 sufficiently above the potential at the slider 93 of the potentiometer 91 that circuit flow through the first triode section of V-2 is cut off. However a positive voltage signal applied to junction point 89 of the voltage divider raises the potential of the grid 94 so that the first section conducts current as long as the potential is held positive and the resulting current flow through the plate resistor 97 drives the grid 104 sufficiently negative to cut off current flow through the second triode section. Because of the amplifying action and the positive feedback provided by the common cathode resistor 101 the transfer of current flow from one section to the other occurs instantaneously when a certain potential is reached by the grid 94. The amplitude of the signal required to reach this potential is adjusted by varying the position of the slider 93 along the length of the potentiometer 91. This circuit thus affords an adjustable threshold limit which the incoming amplified signals must exceed before the trigger circuit B responds to the signals. It thus constitutes what may be known as an amplitude filter that passes only the larger amplitude signals.

The substantially square wave output appearing at the plate 96 of the trigger stage B is differentiated through a coupling condenser 106 and resistor 107 to provide sharp spikes or pulses of voltage corresponding to the sides of the square wave output of the trigger stage. The resistor 107 is bypassed with a crystal rectifier 108 to suppress the positive pulses of voltage which would otherwise appear at the junction between the condenser 106 and resistor 107. The negative spikes of voltage are coupled through a condenser 109 to a normally conducting grid 110 of a monostable multivibrator constituting stage C. The grid 110 is connected to the B+ lead 65 through a resistor 111 which preferably is in the order of four megohms resistance. The grid is also connected through a timing condenser 112 to a plate 113 of the first section of the duotriode V-3 of which the grid 110 is part of the second section. The plate 113 is fed from the B+ lead 65 through a resistor 114 and potentiometer 115 the combined resistance of which is in the order of 12,000 ohms. Cathodes 116 and 117 of the tube V-3 are connected to the grounded lead 66 through a common cathode resistor 118 having a resistance in the order of 15,000 ohms. A second plate 119 cooperating with the grid 110 is fed through a plate resistor 120 having a resistance of approximately 30,000 ohms and is also connected through a voltage divider comprising resistors 121 and 122 to a grid 123 of the first section of the duotriode V-3. The resistors 121 and 122 are bypassed with small condensers 124 and 125 to improve the high frequency response of the voltage divider.

In the absence of input signals from the trigger stage B transmitted through the coupling condenser 109, the monostable multivibrator, which is a form of single cycle oscillator, is in its quiescent state or stable state with a second section of the tube conducting current and the grid 110 drawing a small amount of grid current through the resistor 111. In this condition the cathodes 116 and 117 are approximately 45 volts positive with respect to ground with the grid 110 at the same potential and the plate 119 at a potential of approximately 70 to 75 volts. This voltage at the plate 119 is sufficiently low so that the grid 123 is sufficiently negative with respect to its cathode 116 so that the first section of the tube V-3 is nonconducting. Upon the arrival of a negative pulse through the condenser 109 the grid 110 is momentarily driven negative which results in a reduction in current flow through the second section of the tube and a consequent rise in potential of the grid 123 permitting the first section of the triode to conduct current. The flow of current through the plate resistors 114 and 115 of the first section of the tube results in a voltage drop at the plate 113 which, transmitted through the coupling or timing condenser 112, drives the grid 110 negative in an amount corresponding to the voltage drop across these plate resistors 114 and 115. This cuts off the flow of current through the grid 110 and immediately the condenser 112 starts charging at a rate determined by the time constant of the circuit elements 111 and 112. As the condenser 112 charges the potential on the grid 110 rises until finally it reaches the point where it permits conduction through the second half of the tube thus resulting in a negative going voltage change at the first grid 123 and a return of the circuit to its stable state. Preferably the condenser 112 is of such a size that the circuit remains in the unstable state for approximately 25 to 30 milliseconds.

While the first section is conducting current, the oscillator being in its unstable state, the circuit is not responsive to additional pulses supplied through the condenser 109. However it will respond to the first pulse received after the second section again becomes conducting. This stage thus acts as a frequency filter in that it transmits output pulses through an output coupling condenser 126 in accordance with the received signals from the trigger stage B as long as the frequency of such signals is below the frequency of the monostable multivibrator as fixed by its recovery time. When the frequency of the incoming signals increases above this rate the oscillator ignores some of the signals and responds only to the first signal occurring after each return to the stable state. Thus regardless of the frequency of the incoming signals, as long as they exceed a certain frequency, the output frequency remains substantially constant and is actually a submultiple of the input frequency the ratio being such that the output frequency approaches but does not exceed the frequency limit determined by the recovery time or oscillation time of the oscillator.

The output pulses from the monostable multivibrator or oscillator C are integrated by a circuit that includes the coupling condenser 126, a second condenser 127, a pair of crystal rectifiers 128 and 129, and resistor 130, 131, 132 and 133. The first section of the duotriode V–4 cooperates with this circuit. This triode section includes a plate 135 that is fed through a plate resistor 136 from a positive voltage source approximately 150 volts positive with respect to the B+ line 65. In this integrating circuit the resistor 130 and the crystal rectifier 128 are connected in parallel between the coupling condenser 126 and the grounded lead 66. The rectifier is connected to pass current when the junction between the rectifier and the condenser 126 tends to swing positive. Negative going voltage signals transmitted through the coupling condenser 126 are transmitted through the second rectifier 129 and resistor 131 to a junction point 137 that is connected to the resistor 132 leading to a grid 138 of the duotriode V–4 and to the condenser 127. The negative going signal applied to this junction 137 tends to reduce current flow through the duotriode section thus producing a positive going voltage at the plate 135 and current flow through the condenser 127 to the junction 137.

In the actual operation of this circuit, in the absence of any signals from the oscillator C, the first section of the duotriode V–4 conducts current since there is no grid bias because the cathode 139 is tied directly to the grounded lead 66 and the grid is returned to the same line by way of resistor 132, junction point 137, and resistor 133. The voltage at the plate 135 is thus a few volts positive with respect to the return or ground line 66. When a signal is received and the oscillator executes a cycle of oscillation the first portion of such cycle is a negative going signal appearing at the potentiometer 115 and transmitted through the condenser 126. This negative going signal tends to drive the junction point 137 negative thus cutting off or reducing current flow through the first section of tube V–4. This reduction in current flow causes a positive signal at the plate 135 causing current to flow through the condenser 127, resistor 131, and rectifier 129 into the condenser 126. This current flow maintains the junction between the resistor 130 and condenser 126 slightly negative with respect to ground and results in a charge being transferred from the condenser 127 to the condenser 126. This transfer of charge is completed during the first portion of the cycle of oscillation of the oscillator since the resistor 131 is ordinarily in the order of 15,000 to 20,000 ohms which results in a very small time constant for this circuit. At the end of the cycle of oscillation of the oscillator C the positive going signal at the plate 113 is transmitted through the condenser 126 tending to drive the junction or connection between condenser 126 and resistor 130 positive. This is prevented by current flow through the rectifier 128. The net effect of this sequence of operations is to leave the condenser 127 with a charge of approximately 40 volts in addition to its original charge and leave the junction point 137 approximately 2 volts negative with respect to the ground line 66. This voltage on the junction 137, as a result of the additional charge in the condenser 127, immediately tends to leak off through the resistor 133. This discharge rate is comparatively slow, the resistor 133 being in the order of 500,000 ohms and the equivalent capacity of the condenser 127, taking into account the action the triode V–4, being in order of 1 to 2 microfarads.

Additional signals or oscillations of the oscillator C occurring before the condenser 127 has time to discharge through the resistor 133 results in additional charges being transmitted to the condenser 127 with the result that the voltage at the plate 135 rises in staircase fashion one step per cycle. Three to five cycles of oscillation of the oscillator C occurring in rapid succession transmits enough charge to the condenser 127 so that the potential of the plate 135 becomes positive with respect to the B+ lead 65 thus raising the grid potential of the grid 141 of a second section of the duotriode V–4 above the potential or to the potential of its cathode 142 which is tied directly to the B+ lead 65 maintained at approximately 150 volts positive with respect to ground. This allows the second section of the duotriode V–4 to conduct current through a lead 143 connected to its plate 144. Current flow through the lead 143 is a signal that the chart 23 of the weighing scale is moving rapidly enough that recordings should not be taken.

Referring again to the pulse integrating circuit including the first section of the duotriode V–4, it may be noted that while three to five cycles of oscillation, depending upon the adjustment of the potentiometer 115 and thus the magnitude of the voltage applied to the condenser 126, may be required to produce an output signal, that the same number of cycles slowly repeated would not result in an output signal because of the draining of the charge from the condenser 127 by way of the resistor 133. The components are selected so that the rate of discharge of the condenser 127 through resistor 133 will not permit a sufficient charge to be accumulated on the condenser 127 if the frequency of the incoming signal is below a certain frequency which is somewhat less than the maximum frequency accepted by the oscillator and which corresponds to the maximum velocity that the chart may be moving and still be recorded without objectionable error. This frequency selective circuit including the oscillator C and the pulse integrating circuit associated with the first section of V–4 has the peculiar advantage, unlike most counting circuits, that it saturates or reaches a limiting condition slightly beyond the point at which it gives an output signal without going materially beyond such condition. Thus it is able to respond quickly when the incoming frequency drops below the limiting value so as to immediately give an output indication of such condition.

This circuit thus has the desirable features that it provides an output signal to prevent the recording of indications whenever the average frequencies of the incoming signals from the photoelectrically received impulses is over a certain frequency. It likewise gives a signal if vibration or other quick motion of small extent occurs but sets a lower limit by requiring that at least three to five signal impulses be received following a static condition before an output signal is given. Thus a small tremor of the scale and chart will not interfere with the recording operation while a larger tremor or jar sufficient to materially displace the indicating mechanism will interrupt the recording operation.

Referring again to FIG. II, the scan detector 57, while not indicated in detail, is arranged with well known coincidence circuits so that the receipt of a signal from the lead 143, the output of the amplitude and frequency filter, results in a signal being given to reset the counters and to turn off the gate 52. In the absence of a signal on the lead 143, the scan detector awaits the start of the next scan or series of pulses and with a first such pulse provides a reset signal to insure that the counters are at zero and opens the gate 52 to allow pulses to pass to the multiplier and be counted. The gate, in the absence of any signal from the filter 60, remains open until the end of a scan has been detected by the detector 57 and the resulting count is then left in the counters until receipt of the next signal from the filter 60 or the scan detector 57 indicating the start of the next series of pulses.

This circuit thus makes possible the completely automatic recording of information from an instrument without the supervision of an attendant without the danger of taking readings while the indicating mechanism is in motion.

Various modifications in the circuits may remain without departing from the spirit and scope of the invention.

Having described the invention, we claim:

1. In a device of the class described, in combination, a system of elements that moves in accordance with a quantity being measured, a stationary frame supporting the system of elements, and means for detecting movements of said elements in excess of a prescribed distance and velocity comprising means for generating an electrical impulse for each increment of movement of the system relative to the frame, circuit means responsive to said electrical impulses for generating electrical output pulses of constant amplitude and time duration, said time duration being generally equal to the time between pulses at said prescribed velocity, said circuit means being non-responsive to impulses occurring during the production of an output pulse whereby the maximum frequency of the output pulses is limited to a frequency corresponding to said prescribed velocity, means for integrating electrical charges corresponding to the output pulses, means continuously tending to discharge the integrator means, and output control means connected to said integrator and adapted to provide an output signal when said integrator accumulates a predetermined charge.

2. In a device of the class described, in combination, a system of elements that moves in accordance with a quantity being measured, a stationary frame supporting the system of elements, and means for detecting movements of said elements in excess of a prescribed distance and velocity comprising means for generating an electrical impulse for each increment of movement of the system relative to the frame, circuit means responsive to certain of said pulses for converting said impulses into a series of output pulses having a maximum repetition rate that corresponds to said prescribed velocity and that is small compared to the maximum rate of said impulses, means for integrating charges corresponding to the output pulses and subtracting from such charges as a function of time, and means responsive to the integrating means for producing an output signal as long as the integrated charges exceeds a predetermined amount.

3. In a device of the class described, in combination, a system of elements that moves in accordance with a quantity being measured, a stationary frame supporting said system, means for detecting movements of said elements in excess of a prescribed distance and velocity comprising means for generating an electrical impulse for each increment of movement of the system relative to the frame, a single cycle oscillator having a stable and an unstable state, said oscillator being triggered to its unstable state by impulses received from said generating means while said oscillator is in its stable state and remaining in said unstable state for a time equal to the time between impulses at the prescribed velocity, integrating means for accumulating charges corresponding to the cycles of oscillation of the oscillator, means adapted to continuously discharge the integrating means, and means for generating an output signal when the integrated charge exceeds a predetermined limit.

4. In a device of the class described, in combination, a system of elements that moves in accordance with a quantity being measured, a stationary frame supporting said system, means for detecting movements of said elements in excess of a prescribed distance and velocity comprising means including photosensitive elements for generating an electrical signal for each increment of movement of the system relative to the frame, a single cycle oscillator having a stable and an unstable state, and connected to be triggered to its unstable state upon receipt of a signal from said means received while in its stable state, said oscillator having a maximum pulse repetition rate generally equal to the frequency of said signals corresponding to the prescribed velocity, means for integrating charges corresponding to the cycles of oscillation of the oscillator, means adapted to continuously reduce the effective charge in the integrating means, and means for effecting an output signal when the charge exceeds a predetermined charge.

5. In a device of the class described, in combination, a system of elements that moves in accordance with a quantity being measured, a stationary frame supporting said system, means for detecting movements of said elements in excess of a prescribed distance and velocity comprising means for generating an electrical signal for each increment of movement of the system relative to the frame, transmitting means connected to said generating means for transmitting only signals exceeding a predetermined amplitude, a single cycle oscillator coupled to said transmitting means, said oscillator having a cycle time that is generally equal to the minimum interval between the transmitted signals corresponding to the prescribed velocity, said oscillator being tripped to its unstable state by signals received while in its stable state, means for integrating electrical charges corresponding to oscillations of said oscillator, means for discharging the integrating means, and means for delivering an output signal when the integrated charges reach a predetermined charge.

6. In a device of the class described, in combination, an element that moves in accordance with a quantity being measured, means for detecting movements of said elements in excess of a prescribed distance and velocity comprising a photoelectric system cooperating with the element and adapted to generate an electrical impulse for each increment of movement of the element, an amplifier for said electrical impulses adapted to amplify those impulses exceeding a fixed threshold voltage amplitude, a single cycle oscillator serving as a pulse generator, said oscillator being coupled to the amplifier and having an appreciable recovery time generally equal to the time between impulses at said prescribed velocity during which it is non-responsive to signals from the amplifier, means for integrating electrical charges corresponding to oscillations of the oscillator, means for discharging the integrating means, and means for delivering an output signal when the integrated charge exceeds a predetermined amount.

7. In a device of the class described, in combination, an element that moves in accordance with a quantity being measured, a photoelectric system cooperating with the element and adapted to generate an electrical impulse for each increment of movement of the element, single cycle oscillator connected to the photoelectric system and adapted to respond to those impulses received while not responding to a previous impulse, a counting condenser, means transferring a generally fixed charge into the condenser for each cycle of oscillation of the oscillator, means continually discharging the condenser, and means coupled to the condenser for producing an output signal when the voltage on the condenser exceeds a predetermined voltage.

References Cited in the file of this patent

UNITED STATES PATENTS

| | | |
|---|---|---|
| 1,931,852 | Reichel | Oct. 24, 1933 |
| 2,762,290 | Moss | Sept. 11, 1956 |
| 2,860,867 | Allen | Nov. 18, 1958 |
| 2,879,054 | Wohler | Mar. 24, 1959 |
| 2,968,181 | Mittelmann | Jan. 17, 1961 |